(12) United States Patent
Duval

(10) Patent No.: US 8,429,920 B2
(45) Date of Patent: Apr. 30, 2013

(54) MAGNETIC REFRIGERATION DEVICE AND REFRIGERATION METHOD

(75) Inventor: Jean-Marc Duval, Quaix en Chartreuse (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 376 days.

(21) Appl. No.: 12/995,917

(22) PCT Filed: Jun. 4, 2009

(86) PCT No.: PCT/FR2009/000652
§ 371 (c)(1),
(2), (4) Date: Dec. 2, 2010

(87) PCT Pub. No.: WO2010/000962

PCT Pub. Date: Jan. 7, 2010

(65) Prior Publication Data

US 2011/0146300 A1    Jun. 23, 2011

(30) Foreign Application Priority Data

Jun. 10, 2008    (FR) ...................................... 08 03221

(51) Int. Cl.
*F25B 21/00*    (2006.01)
(52) U.S. Cl.
USPC .................................... 62/3.1; 62/3.6; 62/467
(58) Field of Classification Search ..................... 62/3.1, 62/3.6, 51.1, 238.1, 383, 467
See application file for complete search history.

(56) References Cited

U.S. PATENT DOCUMENTS

| | | | |
|---|---|---|---|
| 3,108,444 A | | 10/1963 | Kahn |
| 3,765,186 A | | 10/1973 | Vassilev |
| 4,033,734 A | * | 7/1977 | Steyert et al. .................... 62/3.1 |
| 4,107,935 A | * | 8/1978 | Steyert, Jr. ....................... 62/3.1 |
| 4,507,927 A | * | 4/1985 | Barclay ............................ 62/467 |
| 4,532,770 A | * | 8/1985 | Hakuraku et al. ............... 62/3.1 |
| 4,702,090 A | * | 10/1987 | Barclay et al. .................. 62/3.3 |
| 4,704,871 A | * | 11/1987 | Barclay et al. .................. 62/3.1 |
| 4,956,976 A | * | 9/1990 | Kral et al. ....................... 62/610 |
| 5,018,359 A | * | 5/1991 | Horikawa et al. .............. 62/51.1 |
| 5,091,361 A | * | 2/1992 | Hed ............................. 505/163 |
| 5,182,914 A | | 2/1993 | Barclay et al. |
| 5,357,756 A | | 10/1994 | Lubell |

(Continued)

FOREIGN PATENT DOCUMENTS

SU    1668829 A1    8/1991
WO    WO 2004/059221 A1    7/2004

OTHER PUBLICATIONS

Shirron et al., "A compact, high-performance continuous magnetic refrigerator for space missions," *Cryogenics*, 2002, vol. 41, pp. 789-795.

(Continued)

*Primary Examiner* — Mohammad Ali
(74) *Attorney, Agent, or Firm* — Oliff & Berridge, PLC

(57) ABSTRACT

A magnetic refrigeration device for cooling a thermal load including a magnetic screening cage containing means for generating at least one magnetic field, first and second elements made from magnetocaloric material placed fixedly in said magnetic field, thermal conductors connecting one of said elements made from magnetocaloric material to a cold source, and means for suspending elements made from magnetocaloric material. The second element made from magnetocaloric material is housed in a cavity delineated internally by the first element made from magnetocaloric material.

9 Claims, 2 Drawing Sheets

U.S. PATENT DOCUMENTS

| | | | |
|---|---|---|---|
| 5,444,983 A * | 8/1995 | Howard | 62/3.1 |
| 5,463,868 A * | 11/1995 | Peschka et al. | 62/6 |
| 5,737,927 A * | 4/1998 | Takahashi et al. | 62/51.1 |
| 5,934,077 A | 8/1999 | Martinis | |
| 5,934,078 A * | 8/1999 | Lawton et al. | 62/3.1 |
| 6,363,727 B1 * | 4/2002 | Hashimoto et al. | 62/6 |
| 6,467,274 B2 * | 10/2002 | Barclay et al. | 62/3.1 |
| 6,526,759 B2 * | 3/2003 | Zimm et al. | 62/3.1 |
| 6,668,560 B2 * | 12/2003 | Zimm et al. | 62/3.1 |
| 6,758,046 B1 * | 7/2004 | Barclay et al. | 62/3.1 |
| 7,168,255 B2 * | 1/2007 | Saito et al. | 62/3.1 |
| 7,481,063 B2 * | 1/2009 | Kitanovski et al. | 62/3.1 |
| 7,481,064 B2 * | 1/2009 | Kitanovski et al. | 62/3.1 |
| 2002/0053209 A1 * | 5/2002 | Zimm et al. | 62/3.1 |
| 2006/0144048 A1 * | 7/2006 | Schulz | 60/641.8 |
| 2007/0144181 A1 | 6/2007 | Kitanovski et al. | |

OTHER PUBLICATIONS

International Search Report in International Application No. PCT/FR2009/000652; dated Feb. 2, 2010 (with English-language translation).

* cited by examiner

MAGNETIC REFRIGERATION DEVICE AND REFRIGERATION METHOD

BACKGROUND OF THE INVENTION

The invention relates to a magnetic refrigeration device for cooling a thermal load, comprising:
  a magnetic screening cage containing means for generating at least one magnetic field mainly directed in an axial direction,
  preferably coaxial first and second elements made from magnetocaloric material placed fixedly in said magnetic field and connected to one another by first thermal conductors equipped with a first thermal switch,
  second thermal conductors connecting one of said elements made from magnetocaloric material to a cold source and equipped with a second thermal switch,
  first and second means for suspending respectively the first and second elements made from magnetocaloric material.

The invention also relates to a method for refrigerating a thermal load by means of a device according to the invention, wherein a thermal conductor connects the thermal load to the second element made from magnetocaloric material.

STATE OF THE ART

Such a magnetic refrigeration device, known for example from the document U.S. Pat. No. 5,934,077, implements elements made from magnetocaloric material which generate heat when they are magnetized and absorb heat when they are demagnetized. Means for generating at least one magnetic field ensure the magnetization/demagnetization cycle of the elements made from magnetocaloric material. At least one of the elements made from magnetocaloric material is thermally connected by thermal conductors, which may comprise a thermal switch, to a thermal load to be cooled. At least one of the elements made from magnetocaloric material is also connected, by other thermal conductors comprising a thermal switch, to a cold source for heat dissipation, for example a helium bath at 4.2K. The elements made from magnetocaloric material are also connected to one another by other thermal conductors comprising yet another thermal switch. Suitable management of the opening and closing sequencing of the different thermal switches enables different known adiabatic thermal cycles to be performed.

In these magnetic refrigeration devices, adiabatic demagnetization is advantageously multistaged at each cycle: each couple formed by a magnetic material element and by the thermal conductors to another magnetic material element constitutes a stage. Such devices enable lower temperatures (between 10 and 100 mK, typically between 10 and 50 mK) than single-stage devices to be achieved, and enable the operating time to be increased.

In this spirit, the device described by document U.S. Pat. No. 5,934,077 is two-staged: the element made from magnetocaloric material thermally connected to the cold source performs cooling of the element made from magnetocaloric material thermally connected to the thermal load to be cooled.

In the device described by the document U.S. Pat. No. 5,934,077, the elements made from magnetocaloric material are arranged axially in line inside a single coil delivering the axially-directed variable magnetic field. Thus, in addition to the fact that it is impossible to regulate the temperatures of the two elements made from magnetocaloric material independently, the major drawback lies in the fact that the structure obtained is bulky and complex, and in the high heat losses resulting from the inevitably long length of the thermal conductors between the two elements made from magnetocaloric material.

To be able to regulate the temperatures of the two elements made from magnetocaloric material independently, it has also been suggested to provide an axial coil associated with each element made from magneto-caloric material. The elements, still arranged in line in an axial direction, are each surrounded transversely by a corresponding axial coil delivering a magnetic field proper thereto. But the overall bulk remains large and the heat losses remain high. Moreover, the structure to perform magnetic screening between the different magnetic fields and to the outside is very constraining, for example involving the use of compensating coils.

OBJECT OF THE INVENTION

The object of the invention consists in providing a magnetic refrigeration device that does not present the above-mentioned drawbacks, in particular enabling the overall bulk to be reduced and the heat losses to be reduced to achieve an enhanced efficiency.

The device according to the invention is remarkable in that the second element made from magnetocaloric material is housed in a cavity internally delineated by the first element made from magnetocaloric material. The first element made from magnetocaloric material can for example present an annular transverse cross-section perpendicularly to the axial direction.

Such a relative arrangement between the elements made from magneto-caloric material enables the axial length of the refrigeration device to be reduced, thereby reducing the overall dimensions to the same extent. The length of the thermal conductors between the elements made from magneto-caloric material is furthermore reduced, advantageously limiting the heat losses.

According to a preferred embodiment, the means for generating at least one magnetic field comprise a first coil transversely surrounding the first element made from magnetocaloric material and a second coil placed in the cavity of the first element made from magnetocaloric material and transversely surrounding the second element made from magnetocaloric material. The presence of a second coil nested in the first element made from material magnetic enables the magnetic fields passing through the elements made from magnetocaloric material to be regulated independently from one another, thereby making for independent control of the temperature of the two stages without an intermediate screening having to be provided between the two coils.

Other technical features can be used either alone or in combination:
  the second means for suspending are thermally insulated with respect to the first means for suspending,
  the second means for suspending are connected to the first element made from magnetocaloric material to perform suspension of the second element made from magnetocaloric material on the first element made from magnetocaloric material,
  the second means for suspending are formed by at least a first rigid support rod connected to the first element made from magnetocaloric material and connected by thermally insulating support wires to at least a second rigid support rod connected to the second element made from magnetocaloric material,
  said first and second support rods pass through one of the walls of the magnetic screening cage and the support wires are arranged outside the magnetic screening cage.

The method according to the invention is remarkable in that it comprises a plurality of successive thermal cycles during which the means for generating are controlled in such a way as to maintain the second element made from magnetocaloric material at a constant temperature equal to a first predefined value, each thermal cycle successively comprising:

- a first period during which the means for generating are controlled in such a way as to maintain the first element made from magnetocaloric material at a constant temperature equal to a second pre defined value, higher than the first predefined value,
- a second period during which the means for generating are controlled in such a way as to lower the temperature of the first element made from magnetocaloric material below the first predefined value,
- a third period during which the means for generating are controlled in such a way as to maintain the first element made from magnetocaloric material at a constant temperature equal to a third predefined value comprised between the first and second predefined values.

BRIEF DESCRIPTION OF THE DRAWINGS

Other advantages and features will become more clearly apparent from the following description of a particular embodiment of the invention given for non-restrictive example purposes only and represented in the appended drawings, in which.

DESCRIPTION OF A PREFERRED
EMBODIMENT OF THE INVENTION

Figure 1:
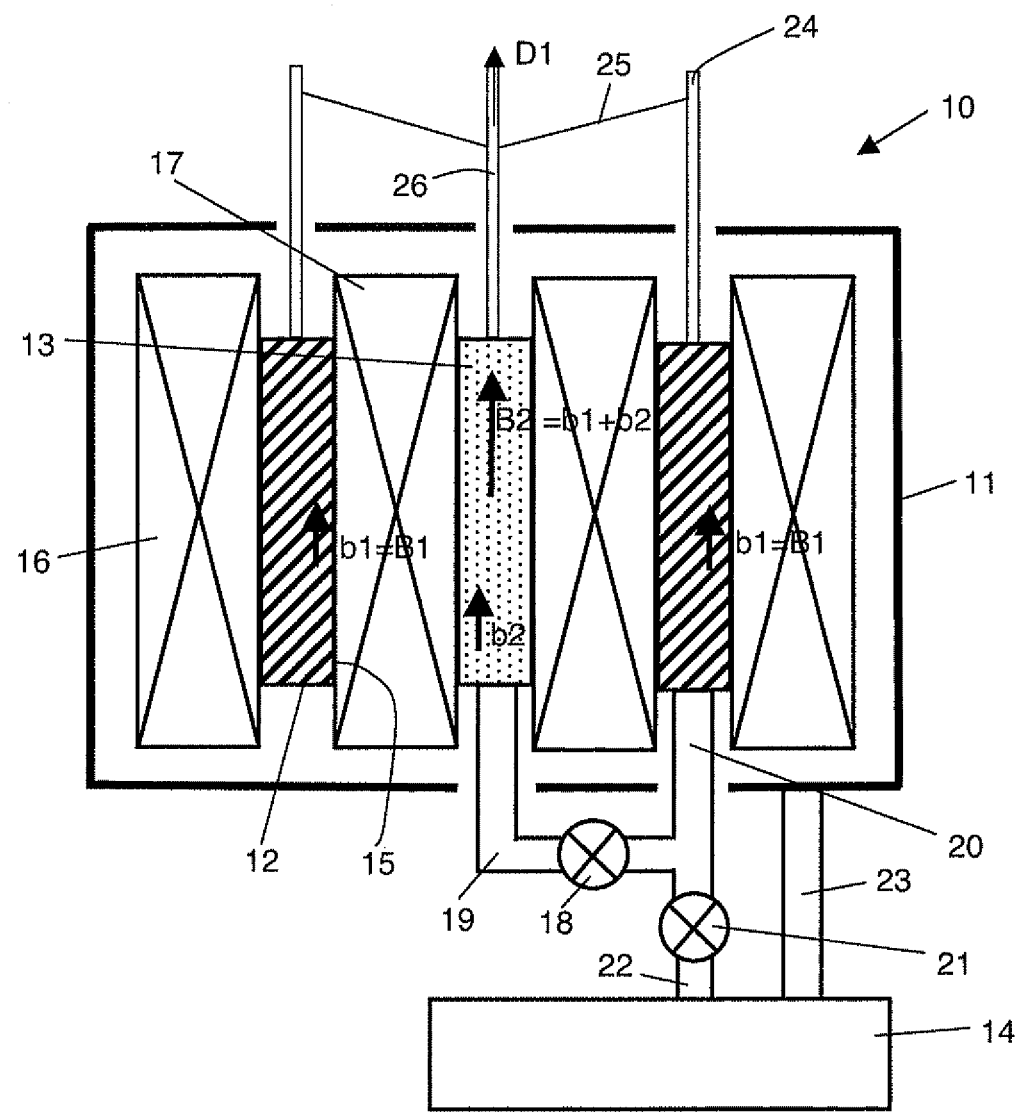
FIG. 1 represents an example of a magnetic refrigeration device according to the invention, in axial cross-section.

In appended FIG. 1, an example of a magnetic refrigeration device 10 with adiabatic operation is represented, comprising a magnetic screening cage 11 housing means for generating at least one variable magnetic field mainly directed in an axial direction D1 inside cage 11. The means for generating at least one magnetic field, which will be described further on, are placed transversely facing two elements made from magnetocaloric material 12, 13 securely placed inside cage 11 in said at least one magnetic field. Elements 12, 13 are preferably coaxial. In schematic manner, elements 12 and 13 are in contact with the means for producing at least one magnetic field. However, the person skilled in the trade will be aware that in reality there is no contact, as these elements have to be thermally insulated.

In a manner that is not represented, at least one of elements 12, 13 is thermally connected to a thermal load (not represented) to cool the latter. For this purpose and as illustrated, at least one of elements 12, 13, in particular the other element 12, 13, is thermally connected to a cold source 14, for example in a manner described further on.

Cage 11, cold source 14 and thermal load to be cooled are for example arranged along the axial direction D1, cold source 14 and thermal load being located on each side of cage 11. However their alignment axis can be distinct from axial direction D1, in the same way as cold source 14 and thermal load to be cooled can be located on the same side of cage 11 without departing from the scope of the invention. An arrangement can also be envisaged wherein cage 11, cold source 14 and thermal load to be cooled are not aligned.

In a possible application which is in no way restrictive, magnetic refrigeration device 10 will be used for producing a refrigeration means, for example a cryostat, operating close to absolute zero temperature, typically at temperatures of less than 1 K and more particularly at temperatures able to be less than 100 mK. The elements made from magnetocaloric material 12, 13 can in particular be formed by capsules filled by a magnetocaloric material, which may be paramagnetic, chosen according to the temperature of use. These materials can be CMN (for temperatures less than 100 mk or even less than 40 mK), CCA, CPA (for temperatures comprised between 30 mK and 200 mK, more particularly comprised between 50 mK and 100 mK), FAA, DGG, GGG and so on. With a suitable magnetocaloric material, it is conceivable to use magnetic refrigeration device 10 for much higher operating temperatures, for example close to the ambient temperature. For the first applications envisaged (temperature close to absolute zero), cold source 14 can for example be formed by a helium bath presenting a temperature for example comprised between 1.5K and 4.2K.

The elements made from magnetocaloric material 12, 13 have the main property of generating heat when they are magnetized and of absorbing heat when they are demagnetized. The means for generating at least one variable magnetic field in which elements 12, 13 are fixedly placed serve the purpose of applying the magnetization and demagnetization cycles to elements 12, 13.

According to one feature of the invention, the first element made from magnetocaloric material 12 internally delineates a cavity 15 inside which second element made from magnetocaloric material 13 is housed. In the non-restrictive example represented, first element made from magnetocaloric material 12 presents a transverse cross-section of annular shape, perpendicularly to axial direction D1. This results in element 12 having a cylindrical external surface. Cavity 15 is further in the form of a cylinder directed according to direction D1.

The cylindrical external surface of first element 12 is mounted axially inside the internal volume of a first coil 16 contained in the space delineated by screening cage 11. A second coil 17 is further mounted axially inside cavity 15 in such a way that second element made from magnetocaloric material 13 is located inside the internal volume of second coil 17. In this way, first coil 16 transversely surrounds first element made from magnetocaloric material 12 and second coil 17 is placed in cavity 15 of first element made from magnetocaloric material 12 and transversely surrounds second element made from magnetocaloric material 13. First and second coils 16, 17 are preferably coaxial and centered on direction D1 so that second coil 17 is interposed transversely between first and second elements made from magnetocaloric material 12, 13. The combination of first and second coils 16, 17, accompanied by their controlled power supply means, constitutes the means for generating at least one magnetic field, as will be described in greater detail further on The notion of transverse direction corresponds to all the directions included in any plane perpendicular to axial direction D1.

In a manner that is not represented, the thermal connection between magnetic refrigeration device 10 and thermal load to be cooled can for example be formed by a thermal conductor connecting the thermal load and second element made from magnetocaloric material 13. This thermal conductor may be equipped with a thermal switch.

To constitute the two cooling stages of refrigeration device 10 wherein, in its variant represented in FIG. 1, the adiabatic demagnetization is two-stage, elements made from magnetocaloric material 12, 13 are connected to one another by first thermal conductors equipped with a first thermal switch 18. On the same side as first element 12 with respect to thermal switch 18, the first thermal conductors are formed by a first thermal bus 20. On the same side as second element 13 with respect to thermal switch 18, the first thermal conductors are formed by a second thermal bus 19.

In complementary manner, a third thermal bus 22 thermally connects cold source 14 to a point of first thermal bus 20 intermediate between first switch 18 and first element 12. Third thermal bus 22 is equipped with a second thermal switch 21. Third thermal bus 22, complementary with a part of first thermal bus 20 on the side where first element 12 is located, constitutes second thermal conductors connecting first element 12 to cold source 14, the second thermal conductors comprising second thermal switch 21. However, according to the stage attributed to each element 12, 13, it can be provided for the second thermal conductors to connect second element 13 to cold source 14. There is no privileged position of the first and second thermal conductors, their relative position depending on the use that is sought for. In general manner, switch 21 can be in thermal contact either with first thermal bus 20 or with second thermal bus 19. The choice of the position of switch 21 can be made according to the volumes of magnetic materials necessary for each stage, to the materials composing the mechanical suspensions available and to optimization of the total mass of the assembly.

To maintain the temperature of screening cage 11, third thermal conductors connect cage 11 to cold source 14. The third thermal conductors are formed by a fourth thermal bus 23. To maintain the temperature of the coils, it is possible to use a thermal connection with the screening cage, a thermal connection with the cold source or a thermal connection with the magnetocaloric materials.

Elements made from magnetocaloric material 12, 13 are respectively secured inside screening cage 11 by first and second means for suspending, in order to avoid direct contacts between elements 12, 13 and cage 11 and/or coils 16, 17. To limit heat losses, the second means for suspending are thermally insulated with respect to the first means for suspending. Only the second means for suspending are represented. In general manner, the first means for suspending can be between any part securely fixed to the cold source and elements 12, if the thermal switch connects the cold source to bus 20. In similar manner, the first means for suspending can be between any part securely fixed to the cold source and elements 13 if thermal switch 21 connects the cold source to bus 21.

For example the first means for suspending (not shown) can be formed by at least one rigid support rod connected to first element made from magnetocaloric material 12 and connected by thermally insulating support wires, for example made from Kevlar®, to at least one connection securely fixed to screening cage 11. Advantageously, each means for suspending is composed of at least one thermally insulating part, for example kevlar wires or carbon wires or carbon fiber tubes.

To limit heat losses, the second means for suspending which perform securing of second element 13 inside first element 12 do not comprise any common parts with the first means for suspending so as to be able to eliminate any thermal connection between second element 13 and cage 11. On the contrary, the second means for suspending are connected to first element made from magnetocaloric material 12 to perform suspension of second element made from magnetocaloric material 13 on first element made from magnetocaloric material 12. There is no privileged position of the first and second means for suspending, however it is important for there not to be any heat exchange between elements 12 and 13. The advantage of this arrangement is that the losses caused by the means for suspending on the coldest stage (element 13 in the illustrated example) are greatly reduced by the fact that these means for suspending press on a stage at intermediate temperature (here element 12) rather than on the parts whose temperature is equal or substantially equal to that of the cold source, i.e. for example cage 11 or cold source 14.

In a privileged embodiment, it is interesting to mechanically connect magnetocaloric elements 13 to base 11 and element 12 to element 13. This inversion is beneficial in particular if the cold source is connected to thermal bus 19 by means of thermal switch 21. This embodiment is therefore slightly different from the one illustrated in FIG. 1 in which the cold source is connected to thermal bus 20.

The second means for suspending are formed, as illustrated for example purposes only, by at least a first rigid support rod 24 (three in this case) connected to first element made from magnetocaloric material 12 and connected by thermally insulating support wires 25 to at least a second rigid support rod 26 (one only in the illustrated example) connected to second element made from magnetocaloric material 13. First and second support rods 24, 26 pass through one of the walls (the top wall) of magnetic screening cage 11, and support wires 25 are arranged outside magnetic screening cage 11. Support wires 25 are for example made from Kevlar®.

The different thermal switches can be formed by switches known as gas-gap switches which are advantageously insensitive to magnetic fields. Use of the latter is conceivable for an operating temperature of more than 200 mK. For lower temperatures, the thermal switches can be of supraconductor type or of magnetoresistive type, both requiring a location where the value of the magnetic field(s) is relatively low. Any other type of suitable thermal switch can be envisaged.

In the foregoing, coils 16, 17 are fixed solenoid coils and preferably comprise multi-turn spiral conducting windings supplied with direct current of adjustable value. Coils 16, 17 are preferably coaxial and the axis of coils 16, 17 is preferably identical to the axis of elements 12, 13. Adjustment of the supply current value of each of coils 16, 17 has the effect of adjusting the flux of the magnetic field generated in the internal volume delineated by the latter, this magnetic field being directed mainly in axial direction D1. Naming b1 and b2 the magnetic field (in Teslas T) respectively generated by first and the second coils 16, 17 in its internal volume, the following equations are then approximately verified:

$$b1 = N1 * I1 * \mu 0$$

$$b2 = N2 * I2 * \mu 0$$

where:
N1, N2 correspond respectively to the number of turns of coils 16, 17 per meter,
I1, I2 correspond respectively to the supply current of coils 16, 17 in amps A,
$\mu 0$ is the magnetic permeability equal to $4*\pi*10^{-7}$.

Numerical simulations show that the magnetic field respectively generated by first and second coils 16, 17 transversely to the outside of its internal volume is approximately nil or in any case sufficiently homogeneous. Furthermore, the magnetic field generated by second coil 17 transversely to the outside of its internal volume is sufficiently homogeneous to be able to be cancelled with the magnetic field, also homogeneous, of first coil 16. First element made from magnetocaloric material 12 is thereby placed in a magnetic field B1 substantially equal to b1. On the other hand, on account of the fact that second coil 17 is placed in field b1 generated by first coil 16, second element made from magnetocaloric material 13 is placed in a magnetic field B2 equal to the sum of b1 and b2.

To summarize, noting B1 and B2 the globally homogeneous magnetic fields in which first and second elements made from magnetocaloric material 12, 13 are respectively placed, then B1=b1, and B2=b1+b2. This results in:

$$B1 = N1*I1*\mu 0$$

$$B2 = (N1*I1 + N2*I2)*\mu 0$$

As a first approximation, this results in fields B1 and B2 being able to be controlled independently from one another by making currents I1 and I2 vary.

In practice, the temperatures of elements 12, 13 are respectively adjusted by the values of the flux of magnetic fields B1 and B2 in which they are placed. The temperature of first element 12 is therefore directly modulated by the value of current I1 supplying first coil 16. The value of I1 being chosen according to the temperature required for first element 12, the temperature of second element 13 is modulated by the value of current I2 supplying second coil 17. The variations of supply currents I1 and I2 cause successive magnetizations and demagnetizations undergone by elements 12, 13.

Numerical simulations show that it is possible to place peripheral first element 12 in a strong magnetic field B1 (about 0.8 T) with a very weak residual magnetic field B2 (less than 0.1 T) in which central second element 13 is placed. Other variants indicate that it is on the contrary possible to immerse central second element 13 in a very homogeneous magnetic field B2 while at the same time maintaining a magnetic field B1 in which peripheral first element 12 is placed that is homogeneous and preferably almost zero.

The magnetic fields respectively generated by first and second coils 16, 17 transversely to the outside of its internal volume being approximately zero, this results in no magnetic screening being necessary between the different magnetic fields, and also to the outside. It is however conceivable to provide magnetic shields of small size, for example made from iron, to protect the thermal switch. The shape of the screening cage can be chosen to increase the homogeneity of the magnetic field and to enhance the independence of each magnetic field B1 and B2.

However in a simplified alternative embodiment, the means for generating at least one magnetic field can be formed by a single coil 16 arranged in such a way as to surround first element made from magnetocaloric material 12, itself housing second element made from magnetocaloric material 13 in cavity 15 which it delineates internally.

The means for generating at least one magnetic field (here two in number: b1 and b2) described in the foregoing only constitute an example of an embodiment that is in no way restrictive and can be replaced by electro-magnets respectively controlled by variable current generators to bring about the successive magnetizations and demagnetizations undergone by elements 12, 13. These means can also be formed by permanent magnets mechanically connected respectively to means enabling them to be moved, for example in axial direction D1, with respect to elements 12, 13.

In practice, to limit the effects of the magnetic field generated by first coil 16 on second coil 17 (mutual inductance phenomenon), a solution could consist in generating magnetic fields b1 and b2 of opposite directions.

Whatever the variant, the number of demagnetization stages can be greater than or equal to two by correspondingly increasing the number of elements made from magnetocaloric material nested in one another, two adjacent elements being transversely separated by an intermediate coil.

Cavity 15 can be of any shape, provided with a bottom or not, provided that second element made from magnetocaloric material 13 can be at least partially housed therein.

In the alternative embodiment illustrated, elements 12, 13 and coils 16, 17 all have the same axis of revolution along which they are axially positioned so as to all have the same transverse plane of symmetry, this transverse plane being perpendicular to axial direction D1.

Magnetic refrigeration device 10 which has been described in the foregoing can be used to implement all known adiabatic thermal cycles.

In general manner, the homogeneity of magnetic field B1 is defined such that the field can be modified independently in each of the two magnetocaloric elements. If the magnetic field generated by inner coil 17 on outer annular space 12 is not zero but is sufficiently homogeneous, it is then possible to compensate this field by means of the field created by coils 16. In a particular embodiment, it is not necessary for these fields to be independent from one another, it is sufficient for pairs of fields B1/B2 to be accessible in areas 12 and 13. The pairs of fields represent very specific conditions under which the fields compensate one another and can be assimilated to a zero field. These pairs of fields are typically obtained by determining supply current couples for coils 16 and 17.

For example purposes, a homogeneous field is a field that presents a variation of less than 10%, preferably less than 5%, of the nominal field in the volume of magnetocaloric elements 12 and 13.

A refrigeration method which is the object of a second feature of the invention will be described hereafter with reference to FIGS. 2 and 3. This method for refrigerating a thermal load is performed by means of a device according to the first feature of the invention wherein a thermal conductor (not shown) connects the thermal load (not shown) to second element made from magnetocaloric material 13. Second element 13, housed in cavity 15, constitutes a first cooling stage. Peripheral first element 12 constitutes a second cooling stage. Cold source 14 to which first element 12 is thermally connected then comprises an additional cooling stage. As in the foregoing, the first and second cooling stages are achieved by adiabatic demagnetization. To achieve the third cooling stage, cold source 14 can comprise an additional element made from magnetocaloric material having an annular transverse cross-section and surrounding first element 12. In an alternative embodiment, to achieve the third cooling stage, cold source 14 can comprise a sorption cooler (SCO). In the example of method according to the invention described in the following, the third cooling stage is achieved by a SCO.

Figure 2:
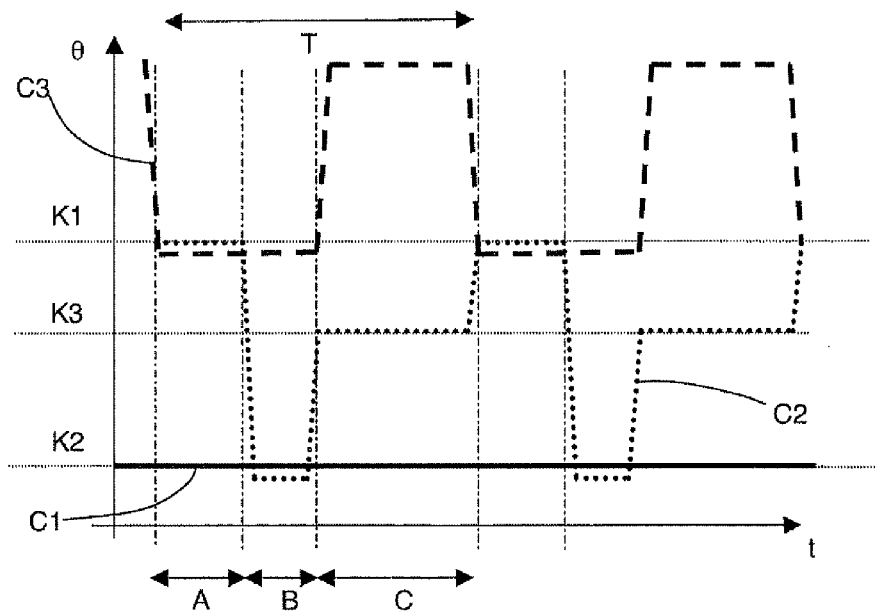
FIG. 2 represents the temperature plots of the elements made from magnetocaloric material during a refrigeration method using a device according to the invention.

With reference to FIG. 2, the cooling method comprises a plurality of successive and repeated thermal cycles of period T during which the means for generating, i.e. coils 16, 17, are controlled in such a way as to maintain second element made from magnetocaloric material 13 at a constant temperature equal to a first predefined value K2. The constant variation versus time t (on the x-axis) of temperature θ2 (in K, on the y-axis) of second element 13 is represented by first curve plot C1 formed by a horizontal line.

Each thermal cycle of period T successively comprises:
  a first period A during which means for generating 16, 17 are controlled so as to maintain first element made from magnetocaloric material 12 at a constant temperature θ1

(in K, on the y-axis) equal to a second predefined value K1, greater than first predefined value K2, a second period B during which means for generating 16, 17 are controlled so as to lower temperature θ1 of first element made from magnetocaloric material 12 below first predefined value K2, and a third period C during which means for generating 16, 17 are controlled so as to maintain first element made from magnetocaloric material 12 at a constant temperature θ1 equal to a third predefined value K3, comprised between first and second predefined values K1, K2.

The variation versus time t (on the x-axis) of temperature θ1 (in K, on the y-axis) of first element 12 is represented by second curve plot C2.

Third curve plot C3 of FIG. 2 represents the variation versus time t of the instantaneous temperature taken by the SCO constituting the third cooling stage. During first and second periods A and B, the temperature of the SCO is kept constant by control means suited to the type of SCO at a predefined value slightly lower than second predefined value K1. During third period C on the other hand, the temperature of the SCO is kept constant at a predefined value considerably higher than second predefined value K1.

For example purposes, first predefined value K2 is substantially equal to 50 mK, second predefined value K1 is substantially comprised between 350 mK and 400 mK, and the predefined value taken by the SCO during third period C is about 2.5 K.

Figure 3:
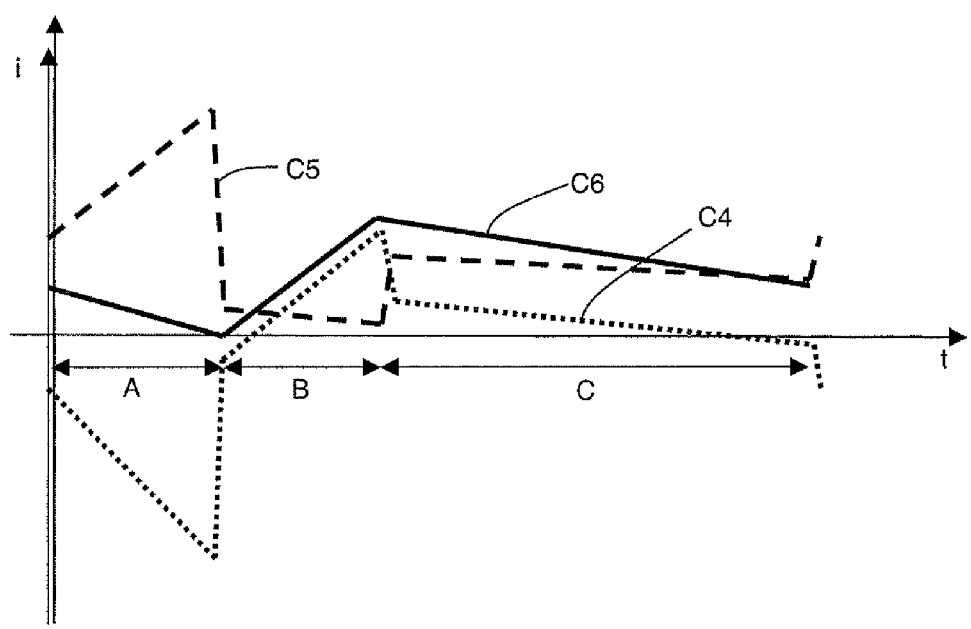
FIG. 3 represents the variation versus time, during a cycle of the method, of the magnetic fields b1 and b2 generated by the coils of FIG. 1, and of the magnetic field inside the coil 17.

Curve plot C4 of FIG. 3 illustrates the variation versus time t (on the x-axis) of magnetic field b2 generated by second coil 17, proportional to each instant to supply current I2 of second coil 17. During first period A, curve plot C4 is a decreasing straight line indicating that field b2 decreases progressively to drop from a value of about −0.1 T to a value of about −0.4 T. In second period B, supply current I2 varies so that field b2 increases in proportional manner very quickly up to a value close to −0.05 T, then less quickly to a value approximately equal to +0.2 T. Finally during third period C, supply current I2 varies so that field b2 decreases in constant manner to a value substantially equal to +0.1 T. The current then varies in constant manner to a value close to −0.05 T, then varies quickly to a value equal to −0.1 T. The positive and negative values of the magnetic fields simply represent magnetic fields of opposite directions.

In parallel with generation of field b2, a variable magnetic field b1 is generated by first coil 16. Curve plot C5 of FIG. 3 illustrates the variation versus time t (on the x-axis) of magnetic field b1 generated by first coil 16, proportional at each moment to supply current I1 of first coil 16. During first period A, curve plot C5 is an increasing straight line indicating that field b1 increases continually to go from a value of about +0.2 T to a value of about +0.4 T. In second period B, supply current I1 varies proportionally to I1 and very quickly so that field b1 decreases to a value close to +0.05 T, then less quickly to a value approximately equal to +0.025 T. Finally during third period C, supply current I1 varies so that field b1 increases very quickly to a value close to +0.15 T, and then decreases slowly to a value approximately equal to +0.125 T. Field b1 then increases very quickly to a value close to +0.2 T.

Curve plot C6 of FIG. 3 illustrates the variation versus time t (on the x-axis) of magnetic field B2 in which second element made from magnetocaloric material 13 is placed. At each moment, a point of curve C6 corresponds to the sum of the corresponding points of curves C4 and C5.

The invention claimed is:

1. A magnetic refrigeration device for cooling a thermal load comprising:
    a magnetic screening cage,
    means for generating at least one magnetic field mainly directed in an axial direction, contained in the magnetic screening cage,
    first and second elements made from magnetocaloric material, placed fixedly in said magnetic field and connected to one another by first thermal conductors equipped with a first thermal switch, wherein the second element made from magnetocaloric material is housed in a cavity delineated internally by the first element made from magnetocaloric material,
    second thermal conductors connecting one of said elements made from magnetocaloric material to a cold source and equipped with a second thermal switch, and
    first and second means for suspending respectively first and second elements made from magnetocaloric material.

2. The device according to claim 1, wherein, perpendicularly to the axial direction, the first element made from magnetocaloric material presents an annular transverse cross-section.

3. The device according to claim 1, wherein the means for generating at least one magnetic field comprise a first coil transversely surrounding the first element made from magnetocaloric material and a second coil placed in the cavity of the first element made from magnetocaloric material and transversely surrounding the second element made from magnetocaloric material.

4. The device according to claim 3, wherein the first and second coils and the first and second elements made from magnetocaloric material are coaxial and have the same transverse plane of symmetry.

5. The device according to claim 1, wherein the second means for suspending are thermally insulated with respect to the first means for suspending.

6. The device according to claim 1, wherein the second means for suspending are connected to the first element made from magnetocaloric material to perform suspension of the second element made from magneto-caloric material on the first element made from magnetocaloric material.

7. The device according to claim 6, wherein the second means for suspending are formed by at least a first rigid support rod connected to the first element made from magnetocaloric material and connected by thermally insulating support wires to at least a second rigid support rod connected to the second element made from magnetocaloric material.

8. The device according to claim 7, wherein said first and second support rods pass through one of the walls of the magnetic screening cage and the support wires are arranged outside the magnetic screening cage.

9. A method for refrigerating a thermal load by means of a device according to claim 1, wherein a thermal conductor connects the thermal load to the second element made from magnetocaloric material, a method comprising a plurality of successive thermal cycles during which the means for generating are controlled so as to maintain the second element made from magneto-caloric material at a constant temperature equal to a first predefined value, each thermal cycle successively comprising:
    a first period during which the means for generating are controlled so as to maintain the first element made from magnetocaloric material at a constant temperature equal to a second predefined value, greater than the first predefined value, a second period during which the means for generating are controlled so as to lower the temperature of the first element made from magnetocaloric material below the first predefined value, a third period during which the means for generating are controlled so as to maintain the first element made from magnetocaloric material at a constant temperature equal to a third predefined value comprised between the first and second predefined values.

\* \* \* \* \*